(12) United States Patent
Lu et al.

(10) Patent No.: US 8,634,187 B2
(45) Date of Patent: Jan. 21, 2014

(54) MOUNTING APPARATUS FOR PCI CARD

(75) Inventors: Wen-Hu Lu, Shenzhen (CN);
Zhan-Yang Li, Shenzhen (CN); Po-Wen Chiu, New Taipei (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 169 days.

(21) Appl. No.: 13/425,387

(22) Filed: Mar. 20, 2012

(65) Prior Publication Data

US 2012/0327578 A1  Dec. 27, 2012

(30) Foreign Application Priority Data

Jun. 23, 2011  (CN) .......................... 2011 1 0171306

(51) Int. Cl.
*G06F 1/16* (2006.01)
(52) U.S. Cl.
USPC ................... 361/679.4; 439/701; 312/334.44; 248/220.21
(58) Field of Classification Search
USPC ................. 345/156, 165, 473, 163, 168, 325;
455/456.1, 501, 13.3, 575.5, 562.1,
455/557; 248/221.11, 309.1, 244, 231.81,
248/41.17, 220.21, 225.11, 298.1;
312/223.1, 223.2, 223.3, 334.44, 333,
312/330.1, 265.5; 439/66, 607.05, 607.01,
439/312, 74, 79, 493, 701, 377, 92, 296,
439/138; 361/801, 816, 679.58, 679.4,
361/679.46, 679.02, 679.08, 679.47,
361/679.49, 679.32, 679.55, 679.33,
361/679.41, 679.48, 679.09, 679.07, 679.31
See application file for complete search history.

(56) References Cited

U.S. PATENT DOCUMENTS

| | | | | |
|---|---|---|---|---|
| 7,684,210 | B2 * | 3/2010 | Kosugi et al. | ................ 361/801 |
| 8,144,463 | B2 * | 3/2012 | Doglio et al. | ............ 361/679.58 |
| 2005/0191870 | A1 * | 9/2005 | Holt et al. | ...................... 439/66 |

* cited by examiner

*Primary Examiner* — Hung Duong
(74) *Attorney, Agent, or Firm* — Altis Law Group, Inc.

(57) ABSTRACT

A mounting apparatus for a PCI card includes an enclosure, a mounting bracket, a securing bracket, and a securing member and a resilient member. The mounting bracket is configured to secure a first end of the PCI card. The securing bracket includes a bracket body and a securing plate. The securing member includes a main body and a securing portion. The main body defines a mounting slot. The securing member is configured to rotate to enable the securing portion to engage the securing plate, and to enable the mounting slot to receive a second end of the PCI card. The resilient member is mounted to the securing bracket and deformed to resist the securing member. The resilient member releases to drive the securing member to move away from the PCI card when the securing portion disengages from the securing plate.

18 Claims, 6 Drawing Sheets

MOUNTING APPARATUS FOR PCI CARD

BACKGROUND

1. Technical Field

The disclosure generally relates to mounting apparatuses, especially, to a mounting apparatus for a peripheral component interconnect (PCI) card.

2. Description of Related Art

PCI cards including network cards, monitor cards and sound cards, are widely used in computers. Conventional methods for mounting PCI cards usually involve screws and screwdrivers in a tedious endeavor, which often result in screws getting lost. A screw falling on a printed circuit board (PCB) can result in damages to the PCB.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
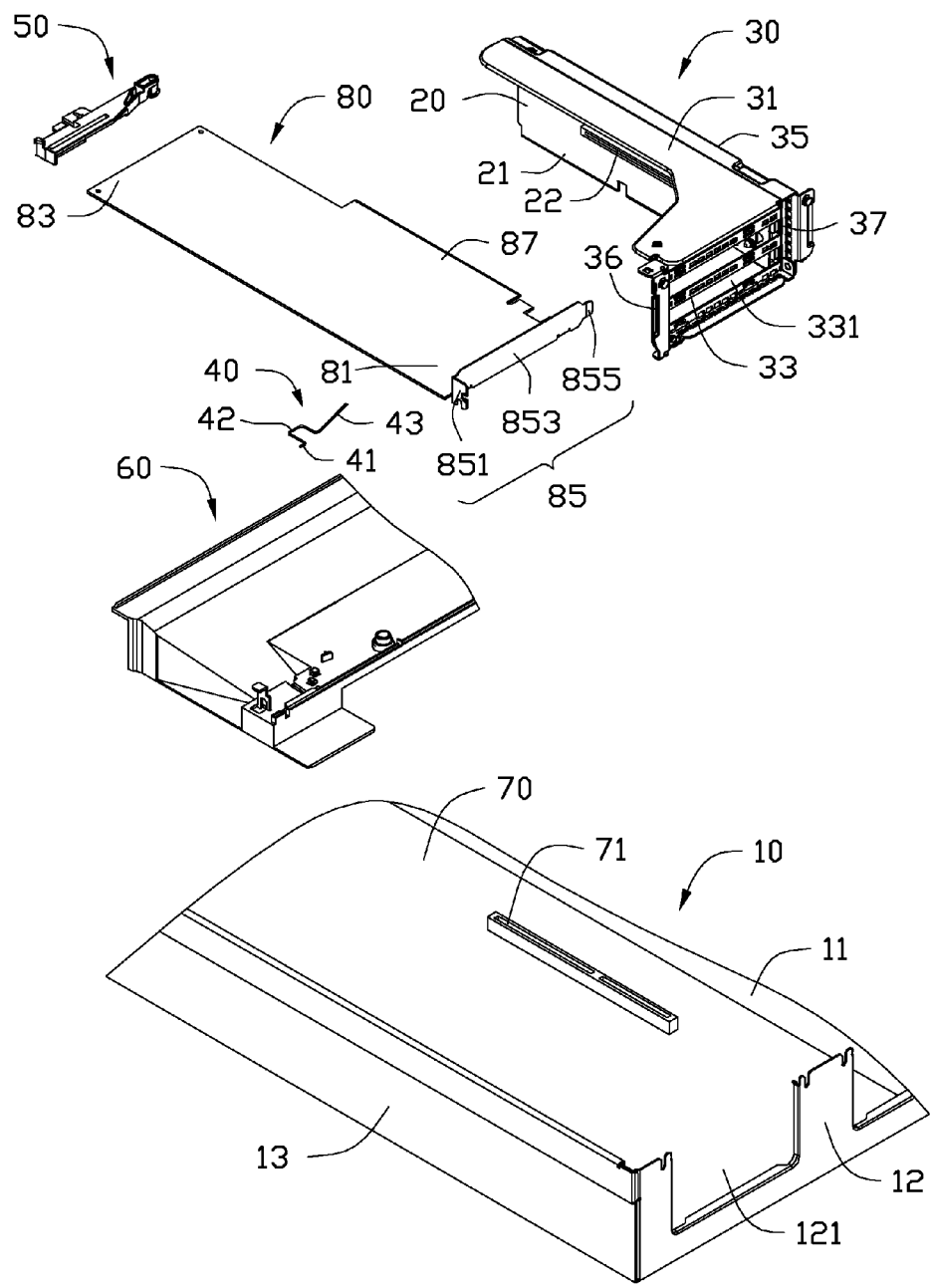
FIG. 1 is an exploded, isometric view of an embodiment of a mounting apparatus for PCI cards.

Referring to FIG. 1, a mounting apparatus for a PCI card 80 is shown. The mounting apparatus in accordance with an embodiment includes an enclosure 10, a mounting bracket 30 mounted on the PCI card 80, a resilient member 40, a securing member 50, and a securing bracket 60 mounted to the enclosure 10.

The PCI card 80 includes a first end 81 and a second end 83. The first end 81 is mounted to a mounting piece 85. The mounting piece 85 includes a mounting portion 851, a main portion 853 extending from the mounting portion 851, and an inserting portion 855 extending from the main portion 853. The PCI card 80 includes an inserting end 87 close to the first end 81.

The enclosure 10 includes a bottom panel 11, a rear panel 12 extending from the bottom panel 11, and a side panel 13 extending from the bottom panel 11. The rear panel 12 and the side panel 13 are substantially perpendicular to the bottom panel 11. A mounting opening 121 is defined in the rear panel 12. A printed circuit board (PCB) 70 mounted on the bottom panel 11. The PCB 70 defines an insertion slot 71. The bottom panel 11 is substantially parallel to the PCB 70.

The mounting bracket 30 includes a top plate 31, a rear plate 33, and a side plate 35. The rear plate 33 defines a plurality of elongated slots 331. The rear plate 33 includes a blocking tab 36. The side plate 35 defines a plurality of openings 37 corresponding to the inserting portion 855 of the mounting piece 85. A converting card 20 is mounted to the side plate 35. The converting card 20 defines a converting slot 22 corresponding to the inserting end 87 and includes an inserting head 21 corresponding to the insertion slot 71 of the PCB 70.

The resilient member 40 includes a connecting end 41, a positioning portion 42 extending from the connecting end 41, and a resilient arm 43 extending from the positioning portion 42. In one embodiment, the positioning portion 42 is U-shaped.

Figure 2:
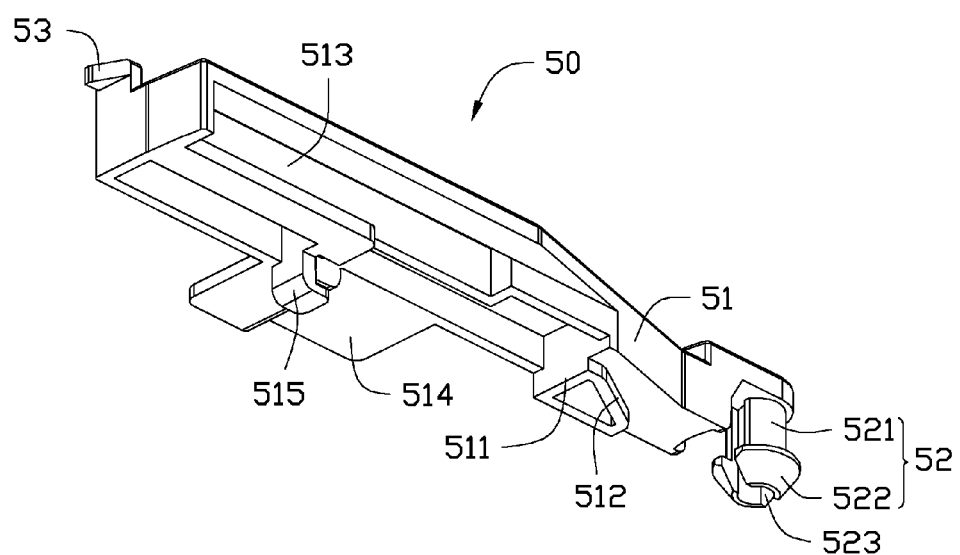
FIG. 2 is an isometric view of a securing member of FIG. 1.

Referring to FIG. 2, the securing member 50 includes a main body 51, a pivot portion 52 extending from the main body 51, and a securing portion 53 extending from the main body 51. In an embodiment, the securing portion 53 is uniform-shaped. The pivot portion 52 includes a connecting portion 521 and an engaging portion 522 extending from the connecting portion 521. The cross-section of the engaging portion 522 is greater than the cross-section of the connecting portion 521 taken along a plane parallel to the bottom panel 11. A cutout 523 is defined in the pivot portion 52 to divide the connecting portion 521 and the engaging portion 522 into two parts. The securing member 50 further includes a resisting portion 511 extending from the main body 51. The resisting portion 511 defines an inclining surface 512 configured to resist the resilient arm 43 of the resilient member 40. The main body 51 defines a mounting slot 513. The securing member 50 further includes an operating portion 514 and a sliding portion 515 extending from the main body 51. The sliding portion 515 is L-shaped.

Figure 3:
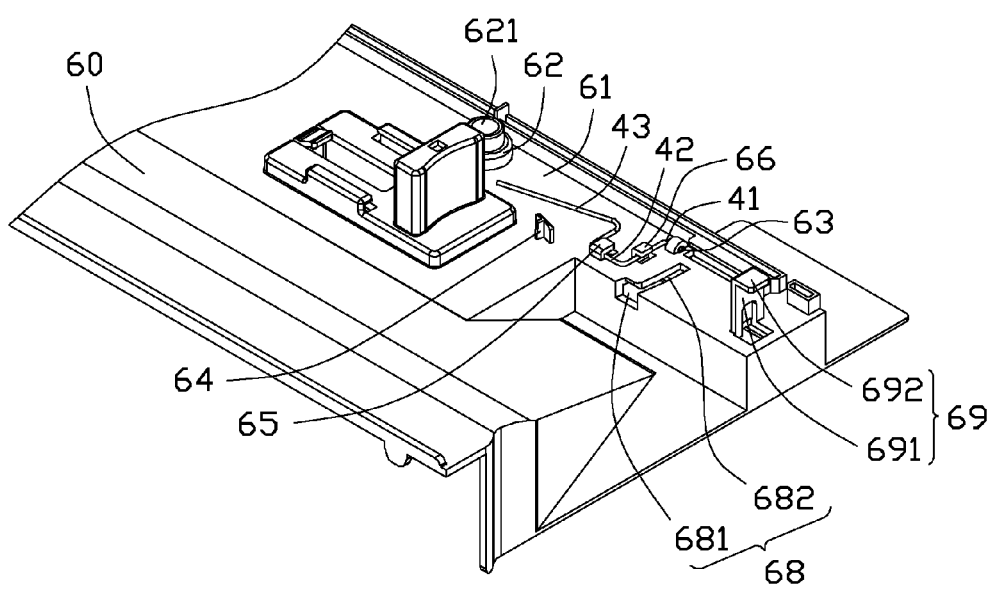
FIG. 3 is an isometric view of a securing bracket and a resilient member of FIG. 1.
Figure 4:
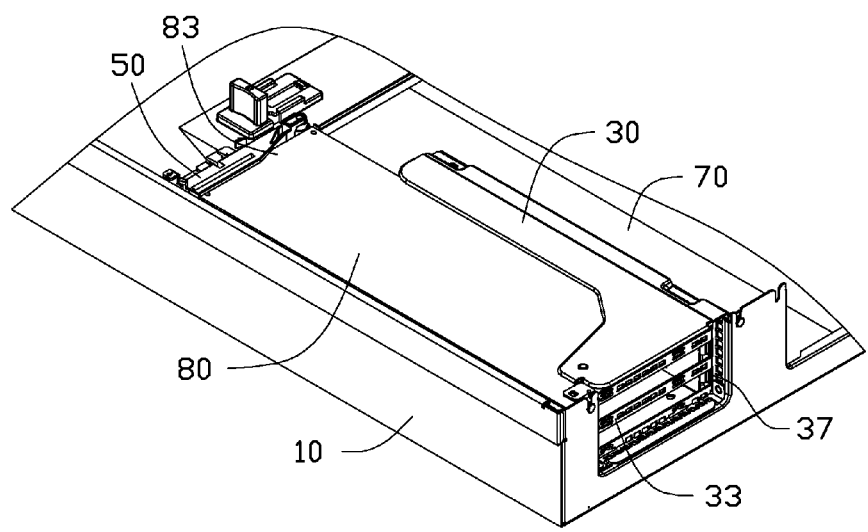
FIG. 4 is an assembled view of FIG. 1.
Figure 5:
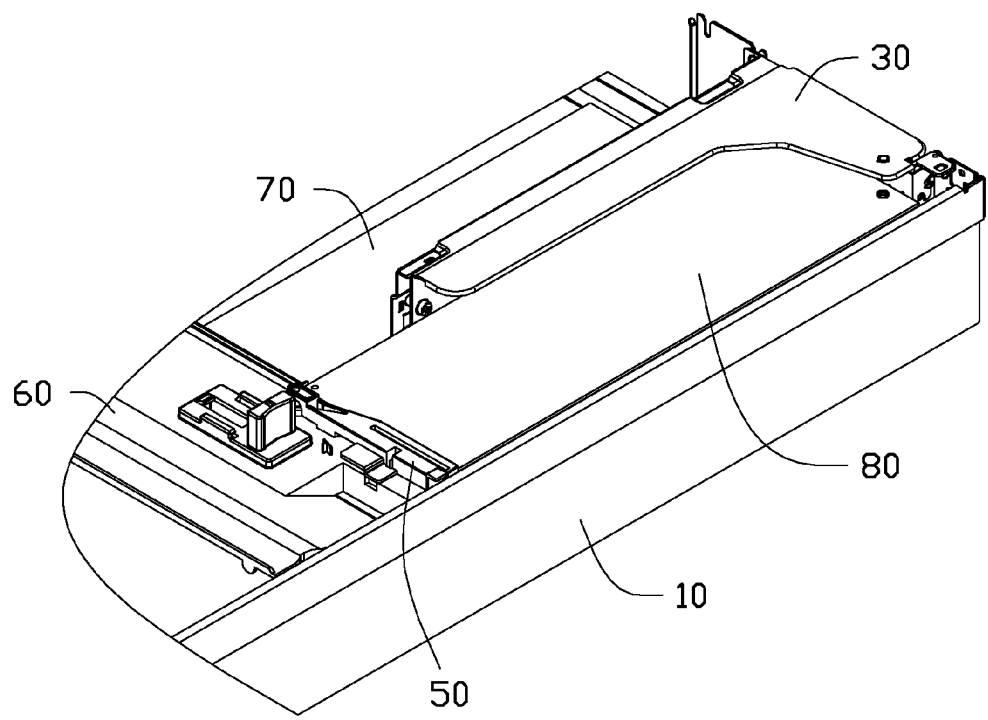
FIG. 5 is similar to FIG. 4, but viewed from another aspect.
Figure 6:
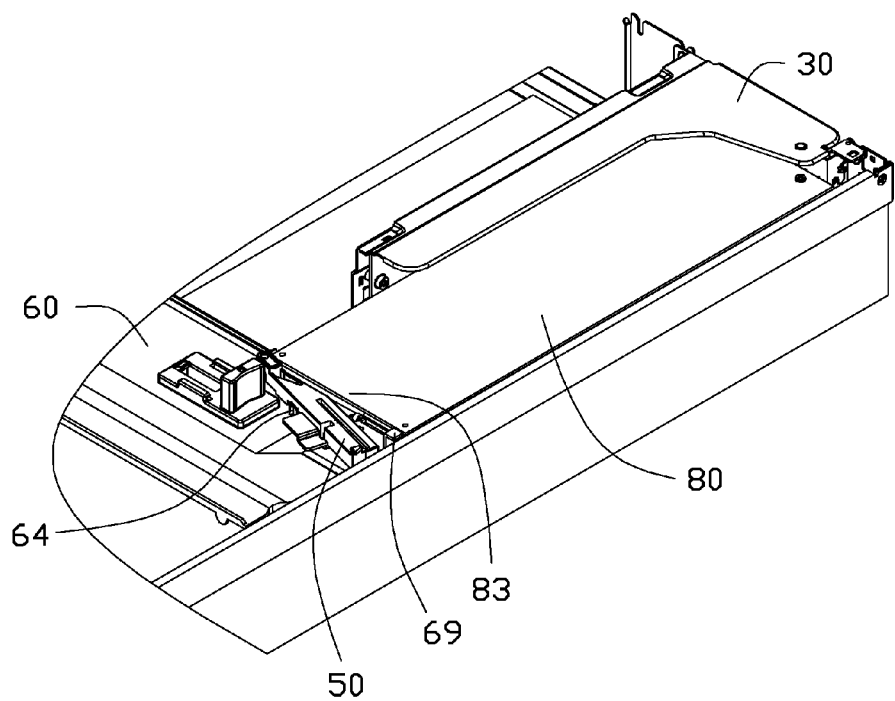
FIG. 6 is similar to FIG. 5, but viewed from another aspect.

Referring to FIG. 3, the securing bracket 60 includes a bracket body 61 and a receiving portion 62 extending from the bracket body 61. The receiving portion 62 defines a pivot hole 621 corresponding to the engaging portion 522. The bracket body 61 defines an inserting hole 63 corresponding to the connecting end 41 of the resilient member 40. The securing bracket 60 further includes a first mounting tab 65 and a second mounting tab 66 extending from the bracket body 61. The first mounting tab 65 and the second mounting tab 66 are both L-shaped and used for positioning the positioning portion 42 of the resilient member 40. The bracket body 61 defines a sliding opening 68. The sliding opening 68 defines a wide part 681 and a narrow part 682 communicating with the wide part 681. The securing bracket 60 further includes a securing plate 69. The securing plate 69 includes an engaging tab 691 extending from the bracket body 61 and a pressing tab 692 extending from the engaging tab 691. The securing bracket 60 further includes a stopper portion 64 configured to stop the securing member 50 moving when the securing portion 53 of the securing member 50 disengages from the engaging tab 691 of the securing plate 69.

Referring to FIGS. 3 to 6, in assembly, the connecting end 41 of the resilient member 40 is received into the inserting hole 63 of the securing bracket 60. The positioning portion 42 is located between the first mounting tab 65 and the bracket body 61, and between the second mounting tab 66 and the bracket body 61. The first mounting tab 65 prevents the positioning portion 42 from moving along a first direction substantially perpendicular to the bracket body 61 and a second direction substantially parallel to the bracket body 61. The second mounting tab 66 prevents the positioning portion 42 from moving along the first direction, and a third direction substantially parallel to the bracket body 61 and the second direction. The pivot portion 52 of the securing member 50 is pivotably mounted in the pivot hole 621. The sliding portion 515 is located in the wide part 681 of the sliding opening 68 and the resilient arm 43 of the resilient member 40 resists the inclining surface 512 of the securing member 50. The securing bracket 60 is secured to the bottom panel 11 of the enclosure 10 via a plurality of fasteners (not shown).

The inserting portion 855 of the PCI card 80 is received in the plurality of openings 37 and the inserting end 87 is inserted into the converting slot 22 of the converting card 20. The mounting portion 851 abuts the blocking tab 36.

The inserting head 21 of the converting card 20 is inserted into the insertion slot 71 of the PCB 70. The second end 83 of the PCI card 80 is placed on the bracket body 61. The securing member 50 is rotated to enable the securing portion 53 of the securing member 50 to engage with the engaging tab 691 of the securing plate 69. At this time, the resilient arm 43 is deformed to resist the inclining surface 512 of the securing member 50. The sliding portion 515 is located in the narrow part 682 of the sliding opening 68. The securing member 50 is capable of rotating in a plane substantially parallel to the PCI card 80. The second end 83 is received in the mounting slot 513.

In disassembly, the pressing tab 692 of the securing bracket 60 is pressed outward to enable the engaging tab 691 to disengage from the securing portion 53. The resilient arm 43 releases to drive the securing member 50 to rotate, thereby driving the mounting slot 513 to move away from the second end 83. Thus, the PCI card 80 can be easily removed from the enclosure 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus for a PCI card, comprising:
an enclosure;
a mounting bracket configured to secure a first end of the PCI card;
a securing bracket mounted in the enclosure, the securing bracket comprising a bracket body and a securing plate extending from the bracket body;
a securing member pivotably mounted on the securing bracket, the securing member comprising a main body and a securing portion extending from the main body; the main body defining a mounting slot; wherein the securing member is configured to be rotated such that the securing portion is engaged with the securing plate, and a second end of the PCI card is received in the mounting slot; and
a resilient member mounted to the securing bracket and being deformed to resist the securing member; and the resilient member is released to drive the securing member to move away from the PCI card when the securing portion is disengaged from the securing plate.

2. The mounting apparatus of claim 1, wherein the securing bracket further comprises a first mounting tab extending from bracket body; the bracket body defines an inserting hole; the resilient member comprises a connecting end inserted in the inserting hole, a positioning portion extending from the connecting end, and a resilient arm extending from the positioning portion; the positioning portion is located between the first mounting tab and the bracket body thereby the positioning portion is prevented from moving along a first direction substantially perpendicular to the bracket body.

3. The mounting apparatus of claim 2, wherein the securing bracket further comprises a second mounting tab extending from the bracket body; the positioning portion being located between the second mounting tab and the bracket body thereby the positioning portion is prevented from moving along a second direction substantially parallel to the bracket body; and the first mounting tab is configured to prevent the positioning portion from moving a third direction substantially perpendicular to the second direction and substantially parallel to the bracket body.

4. The mounting apparatus of claim 3, wherein the positioning portion is U-shaped.

5. The mounting apparatus of claim 2, wherein the securing member defines an inclining surface, and the resilient arm resists the inclining surface.

6. The mounting apparatus of claim 1, wherein the securing bracket further comprises a stopper portion, the stopper portion is configured to stop the securing member continuing moving when the securing portion is disengaged from the securing plate.

7. The mounting apparatus of claim 1, wherein the securing member further comprises a sliding portion extending from the main body; the bracket body defines a sliding opening; the sliding opening defines a wide part and a narrow part communicating with the wide part; and the sliding portion is configured to slide into the narrow part through the wide part.

8. The mounting apparatus of claim 1, wherein the securing member further comprises a pivot portion extending from the main body, the pivot portion comprises a connecting portion extending from the main body and an engaging portion extending from the connecting portion; a cross-section of the engaging portion is greater than a cross-section of the connecting portion; a cutout is defined in the pivot portion to divide the connecting portion and the engaging portion into two parts; and the securing bracket defines a pivot hole corresponding to the pivot portion.

9. The mounting apparatus of claim 1, wherein the securing plate comprises an engaging tab extending from the bracket body and a pressing tab extending from the engaging tab; the engaging tab is configured to engage with the securing portion; and the pressing tab is configured to be pressed to drive the engaging tab to disengage from the securing portion.

10. A PCI card assembly, comprising:
an enclosure comprising a bottom panel and a side panel substantially perpendicular to the bottom panel;
a PCI card substantially parallel to the bottom panel, the PCI card comprising a first end and a second end;
a mounting bracket securing the first end of the PCI card;
a securing bracket mounted in the enclosure, the securing bracket comprising a bracket body and a securing plate extending from the bracket body;
a securing member pivotably mounted on the securing bracket, the securing member comprising a main body and a securing portion extending from the main body; wherein the securing member is configured to rotate in a plane substantially parallel to the PCI card such that the securing portion is engaged with the securing plate, and that the second end of the PCI card is located between the bracket body and the main body, thereby the second end is prevented from moving along a direction substantially perpendicular to the bottom panel; and
a resilient member mounted to the securing bracket and being deformed to resist the securing member; and the resilient member is released to drive the securing member to move away from the PCI card when the securing portion is disengaged from the securing plate.

11. The PCI card assembly of claim 10, wherein the securing bracket further comprises a first mounting tab extending from bracket body; the bracket body defines an inserting hole; the resilient member comprises a connecting end inserted in the inserting hole, a positioning portion extending from the connecting end, and a resilient arm extending from the positioning portion; the positioning portion being located between the first mounting tab and the bracket body thereby the positioning portion is prevented from moving along a first direction substantially perpendicular to the bracket body.

12. The PCI card assembly of claim 11, wherein the securing bracket further comprises a second mounting tab extending from the bracket body; the positioning portion being located between the second mounting tab and the bracket body thereby the positioning portion is prevented from moving along a second direction substantially parallel to the bracket body; and the first mounting tab is configure to prevent the positioning portion from moving a third direction substantially perpendicular to the second direction and substantially parallel to the bracket body.

13. The PCI card assembly of claim 12, wherein the positioning portion is U-shaped.

14. The PCI card assembly of claim 11, wherein the securing member defines an inclining surface, and the resilient arm resists the inclining surface.

15. The PCI card assembly of claim 10, wherein the securing bracket further comprises a stopper portion, the stopper portion is configured to stop the securing member continuing moving when the securing portion is disengaged from the securing plate.

16. The PCI card assembly of claim 10, wherein the securing member further comprises a sliding portion extending from the main body; the bracket body defines a sliding opening; the sliding opening defines a wide part and a narrow part communicating with the wide part; and the sliding portion is configured to slide into the narrow part through the wide part.

17. The PCI card assembly of claim 10, wherein the securing member further comprises a pivot portion extending from the main body, the pivot portion comprises a connecting portion extending from the main body and an engaging portion extending from the connecting portion; a cross-section of the engaging portion is greater than a cross-section of the connecting portion taken along a plane substantially parallel to the bottom panel; a cutout is defined in the pivot portion to divide the connecting portion and the engaging portion into two parts; and the securing bracket defines a pivot hole corresponding to the pivot portion.

18. The PCI card assembly of claim 10, wherein the securing plate comprises an engaging tab extending from the bracket body and a pressing tab extending from the engaging tab; the engaging tab is configured to engage with the securing portion; and the pressing tab is configured to be pressed to drive the engaging tab to disengage from the securing portion.

* * * * *